United States Patent
Yamauchi

[11] Patent Number: 6,135,233
[45] Date of Patent: Oct. 24, 2000

[54] STEERING APPARATUS FOR VEHICLE

[75] Inventor: Yoji Yamauchi, Toyota, Japan

[73] Assignee: Toyota Jidosha Kabushiki Kaisha, Toyota, Japan

[21] Appl. No.: 09/167,489

[22] Filed: Oct. 7, 1998

[30] Foreign Application Priority Data

Dec. 10, 1997 [JP] Japan ..................... 9-339933

[51] Int. Cl.⁷ .................................................. B62D 5/04
[52] U.S. Cl. ............................ 180/443; 180/446; 701/41
[58] Field of Search ................................. 180/443, 444, 180/446; 701/41, 42; 280/89.11

[56] References Cited

U.S. PATENT DOCUMENTS

| | | | |
|---|---|---|---|
| 4,561,515 | 12/1985 | Hashimoto et al. | 180/79.1 |
| 4,658,927 | 4/1987 | Kanazawa | 180/142 |
| 4,739,855 | 4/1988 | Miyoshi et al. | 180/142 |
| 4,762,425 | 8/1988 | Saito et al. | 180/79.1 |
| 4,800,974 | 1/1989 | Wand et al. | 180/79.1 |
| 4,825,972 | 5/1989 | Shimizu | 180/79.1 |
| 4,953,650 | 9/1990 | Ohmura | 180/79.1 |
| 5,050,697 | 9/1991 | Umemura | 180/141 |
| 5,065,323 | 11/1991 | Shiraishi et al. | 364/424.05 |
| 5,473,231 | 12/1995 | McLaughlin et al. | 318/433 |
| 5,913,913 | 6/1999 | Okanoue et al. | 701/41 |
| 6,000,491 | 12/1999 | Shimizu et al. | 180/444 |

FOREIGN PATENT DOCUMENTS

| 62-23869 | 1/1987 | Japan . |
|---|---|---|
| 62-238166 | 10/1987 | Japan . |

*Primary Examiner*—Paul N. Dickson
*Assistant Examiner*—Daniel Yeagley
*Attorney, Agent, or Firm*—Oliff & Berridge, PLC

[57] ABSTRACT

A detection value from an absolute position sensor is stored immediately before turning off of an ignition switch and is compared with a detection value of the absolute position sensor at the turning on of the ignition switch. A driving motor is actuated based on detected deviation between the two detection values so as to rotate the output shaft, thereby achieving agreement of the positional relation between the input shaft and the output shaft.

10 Claims, 5 Drawing Sheets

STEERING APPARATUS FOR VEHICLE

BACKGROUND OF THE INVENTION

1. Field of the Invention

The present invention relates to a steering apparatus for vehicle having a variable transmission ratio of a steering angle of turned wheels to a steering angle of a steering wheel.

2. Related Background Art

In the comparative steering apparatus, rotation of a steering shaft coupled to the steering wheel is normally converted to lateral displacement of a tie rod through a gearing system, such as a rack and pinion.

The apparatus employs a transmission ratio changing mechanism for changing a rotation transmission ratio between the input shaft and the output shaft (hereinafter referred to as a transmission ratio) by rotationally driving a gear forming a gearing system by an actuator on this occasion. For example, as shown in FIG. 6, transmission ratios are changed according to vehicle speeds V, thereby assuring driving stability according to the vehicle speeds V.

In order to provide against failure of the transmission ratio changing mechanism described above, the steering apparatus disclosed in Japanese Laid-open Patent Application No. 62-23869 is so arranged that a base transmission ratio (a base gear ratio) Gb as a transmission ratio between the input shaft and the output shaft in a state in which the actuator of the transmission ratio changing mechanism is at a stop is set at a middle point of the transmission ratio variable range VR. Under this setting, even in the event that the actuator for changing the transmission ratio comes to a stop, the apparatus can avoid the situation where the transmission ratio change becomes larger than during the normal operation, thereby relieving a feeling of incompatibility which a driver has.

SUMMARY OF THE INVENTION

This transmission ratio control is always carried out in the state where the ignition switch is on, and the mechanism is so arranged that with turning off of the ignition switch the transmission ratio control is terminated and the actuator for changing the transmission ratio also comes a standstill.

Therefore, as shown in FIG. 6, the transmission ratio immediately before turning off of the ignition switch is the transmission ratio Go at the time when the vehicle speed V is zero, whereas the base transmission ratio, which is the transmission ratio after the off operation of the ignition switch, is Gb described above. There is thus a difference in the setting transmission ratio setting of the transmission ratio changing mechanism between the execution and the stop of the transmission ratio control.

Because of this structure, when the steering wheel is manipulated in the off state of the ignition switch, the output shaft rotates relative to the input shaft at the transmission ratio Gb, which changes the positional relation between the input shaft and the output shaft at the transmission ratio Go in the on state of the ignition switch. This would be a cause of a shift between the neutral position of the steering wheel and the neutral position of the turned wheels.

The present invention has been accomplished in order to solve this problem and an object of the invention is to provide a steering apparatus for a vehicle that can return the positional relation between the steering wheel and the turned wheels into the normal positional relation even in the case where the steering wheel is manipulated during the stop of the vehicle.

A steering apparatus for vehicle comprises: an input shaft coupled to a steering shaft; an output shaft coupled to the input shaft; driving means for effecting relative rotation between the input shaft and the output shaft to change a rotation transmission ratio of the output shaft to the input shaft; control means for carrying out a driving control of the driving means; and position detecting means for detecting a rotational position of at least one of the input shaft and the output shaft; wherein the control means comprises return control means for actuating the driving means, based on a detection result of the position detecting means, to achieve agreement of the positional relation between the input shaft and the output shaft.

The return control means determines, based on the detection result of the position detecting means, whether the steering wheel was manipulated during the period between the end and the start of the rotation transmission ratio control. For example, in the case where the position detecting means is mounted on one of the input shaft and the output shaft, the determination can be made by comparing a detection result stored at the time of the end of a preceding rotation transmission ratio control with a detection result at the time of the start of a new rotation transmission ratio control. When the position detecting means is mounted on both of the input shaft and the output shaft, the determination can be made based on the positional relation between the input shaft and the output shaft at the time of the start of the rotation transmission ratio control. With a decision that the steering wheel was manipulated during the period between the end and the start of the rotation transmission ratio control, the apparatus performs the return process to carry out the driving control of the driving means, based on the detection result of the position detecting means, to achieve agreement of positional relation between the input shaft and the output shaft.

The steering apparatus for vehicle further comprises driving restricting means for restricting driving of the vehicle during a return control carried out by the return control means.

Provision of this driving restricting means permits the apparatus to avoid driving in a disagreed state of the positional relation between the input shaft and the output shaft.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

Embodiments according to the present invention will be described by reference to the accompanying drawings.

Figure 1:
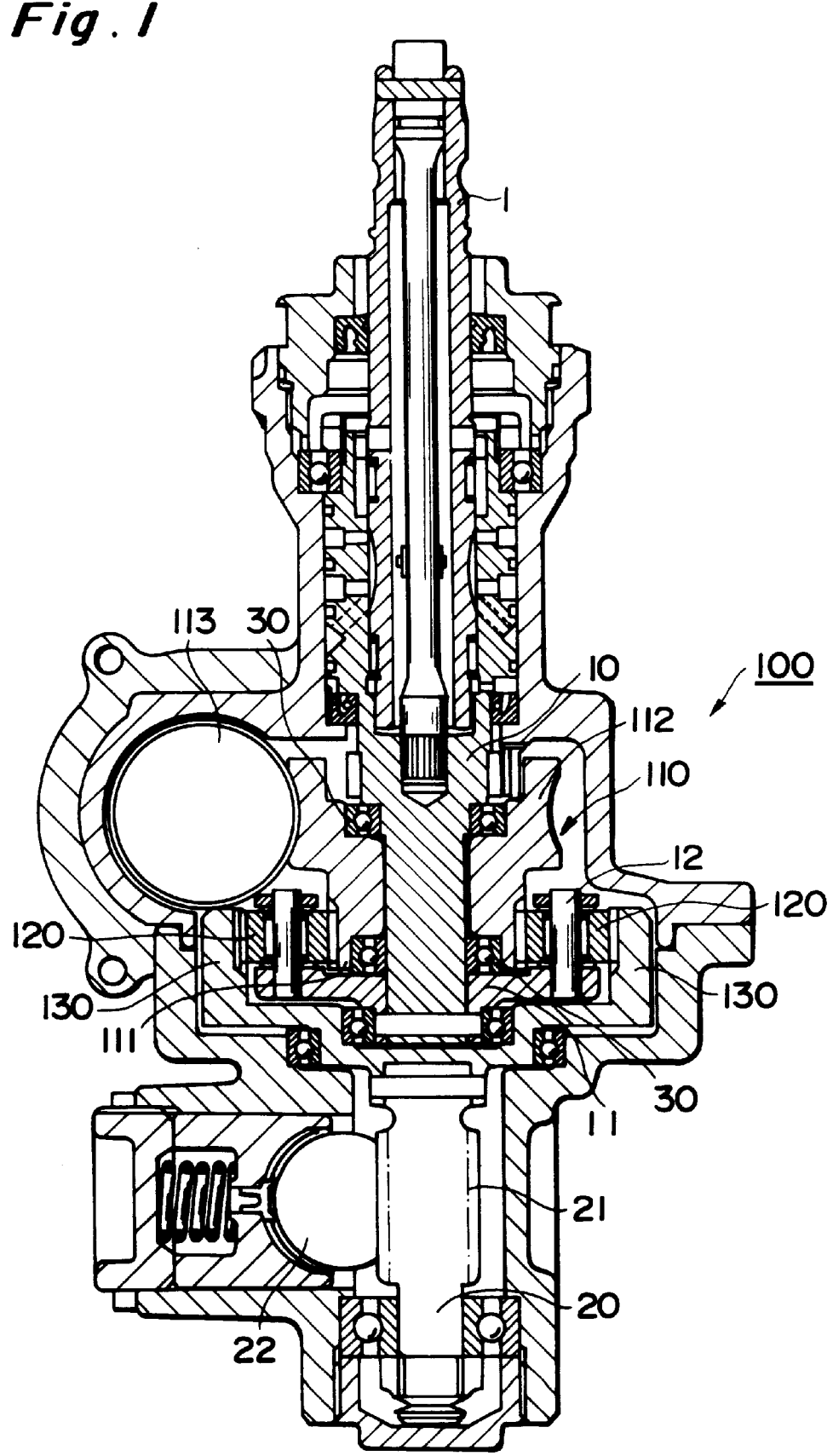
FIG. 1 is a sectional view to show the structure of the steering apparatus for vehicle according to the first embodiment.
Figure 2:
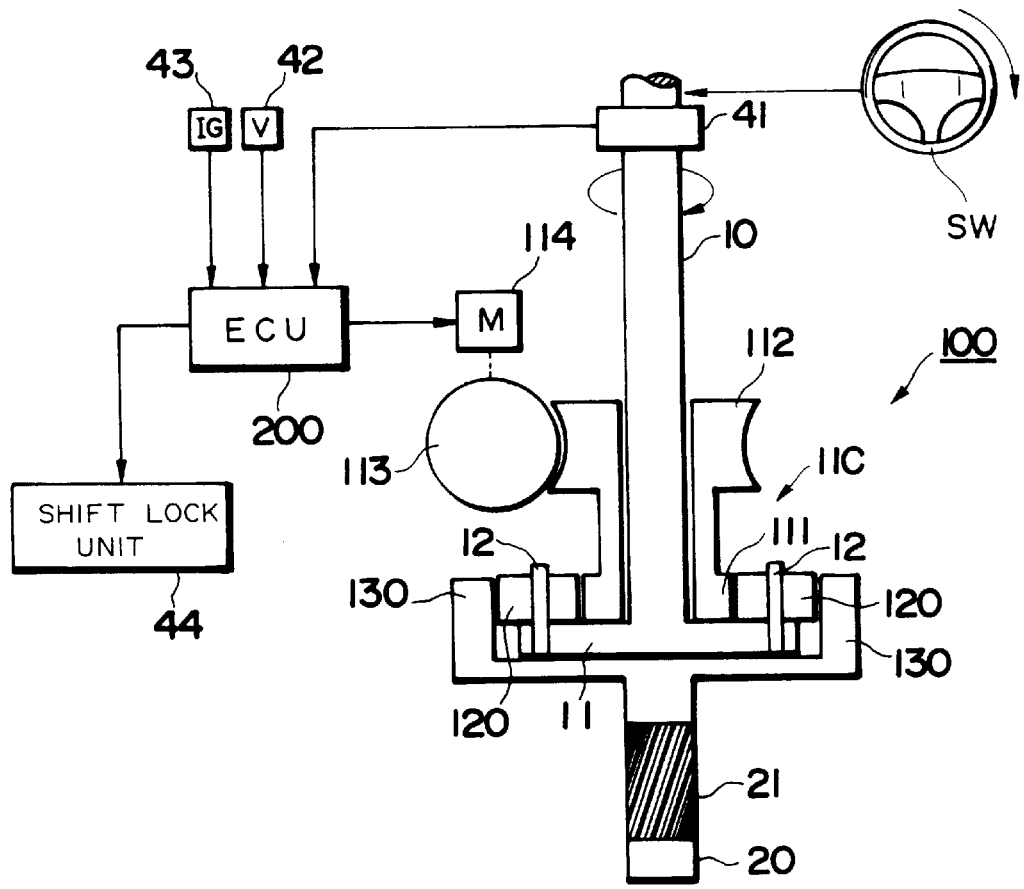
FIG. 2 is a schematic diagram to show the major part of the steering apparatus for vehicle according to the first embodiment.

FIG. 1 and FIG. 2 illustrate a steering apparatus according to the first embodiment.

The input shaft 10 is coupled at the upper end thereof to the steering shaft 1. Steering shaft 1 is coupled to steering wheel SW as shown in FIG. 2. The input shaft 10 is thus structured to rotate in the same direction as the steering wheel does. The other end of the input shaft 10 is coupled through a transmission ratio changing mechanism 100 to the output shaft 20 and a rack shaft 22 (see FIG. 1) is in mesh with a pinion 21 formed in the output shaft 20.

This transmission ratio changing mechanism 100 is a mechanical part for transmitting rotation of the input shaft 10 to the output shaft 20 at a predetermined rotation transmission ratio (gear ratio), which has a function capable of controlling the rotation transmission ratio and which is composed mainly of a sleeve body 110, planetary gears 120, and a ring gear 130.

The sleeve body 110 is formed in a cylindrical shape having a sun gear 111 of an annular shape at one end and a worm wheel 112 of an annular shape at the other end. The input shaft 10 penetrates the inside of the sleeve body 110. The sleeve body 110 is thus arranged on a concentric basis with the input shaft 10. Bearings 30 are interposed between the outside periphery of the input shaft 10 and the inside periphery of the sleeve body 110 (see FIG. 1), so that the input shaft 10 and sleeve body 110 are structured to rotate separately without any constraint on rotation from each other.

A carrier 11 of a disk shape having an outside diameter larger than the sun gear 111 is fixed at the penetration end of the input shaft 10 passing through the sleeve body 110. Three support pins 12 are fixed at equal intervals in the peripheral region of this carrier 11 and each support pin 12 supports a planetary gear 120 in a rotatable state. These three planetary gears 120 are each in mesh with the sun gear 111 located in the central part. When the carrier 11 rotates in unison with the input shaft 10, each planetary gear 120 revolves around the sun gear 111 while being kept in mesh with the sun gear 111.

Figure 3:
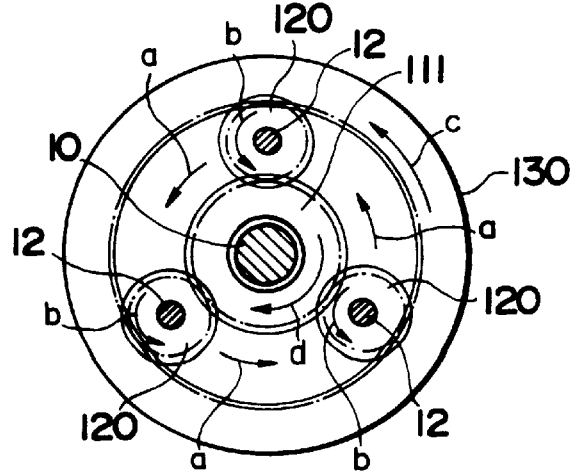
FIG. 3 is a plan view to show only the planetary gear mechanism extracted from the steering apparatus for vehicle.

The ring gear 130 of an annular shape integral with the output shaft 20 is disposed so as to surround each planetary gear 120, and gear teeth formed in the inside periphery of the ring gear 130 are in mesh with each planetary gear 120. Therefore, as shown in FIG. 3, the sun gear 111, planetary gears 120, and ring gear 130 are arranged on a concentric basis, the sun gear 111 is in mesh with each planetary gear 120, and each planetary gear 120 is in mesh with the ring gear 130, thus composing a planetary gear mechanism.

On the other hand, a worm gear 113 is in mesh with the worm wheel 112 forming the sleeve body 110, and this worm gear 113 is structured to be rotationally driven by a driving motor 114.

Now, the operation of each gear will be described.

When a driver rotates the steering wheel, this rotation is transmitted through the steering shaft 1 to the input shaft 10, whereby the input shaft 10 rotates in the same direction as the steering wheel does. On this occasion, the carrier 11 also rotates in unison with the input shaft 10, so that each support pin 12 supported on the carrier 11 also revolves around the sun gear 111.

For example, supposing the support pins 12 move in the direction indicated by arrow a in FIG. 3, the movement of each support pin 12 causes each planetary gear 120 supported by this support pin 12 to move along the direction of arrow a around the sun gear 111 while rotating in the direction indicated by arrow b about the support pin 12. When the planetary gears 120 rotate in the direction of arrow b, the ring gear 130 in mesh with the planetary gears 120 rotates in the direction of arrow c, so that the output shaft 20 rotates in this direction. Therefore, the rotation of the input shaft 10 is transmitted to the output shaft 20 in the same direction and the output shaft 20 comes to rotate in the same direction as the input shaft 10 does.

When the driver rotates the steering wheel in the opposite direction, each gear rotates or moves in the opposite direction to the arrows shown in FIG. 3, so that agreement is also achieved similarly between the rotating direction of the input shaft 10 and the rotating direction of the output shaft 20 in this case.

On the other hand, when the driving motor 114 rotates the worm gear 113, this rotation is transmitted through the worm wheel 112 to the sleeve body 110, thereby rotating the whole of the sleeve body 110. Namely, the sleeve body 110 is driven to rotate in the direction according to the rotating direction of the worm gear 113. Therefore, the sun gear 111 forming the sleeve body 110 also rotates, whereby the rotation of the sun gear 111 changes a rotation amount of each planetary gear 120 in mesh with the sun gear 111.

For example, when the planetary gears 120 move in the direction of arrow a in conjunction with the steering operation and when the sun gear 111 is rotated in the direction of arrow d of FIG. 3, this results in increasing the rotation amount of the planetary gears 120 rotating in the direction of arrow b and also increasing the rotation amount of the ring gear 130 in mesh with the planetary gears 120. When the sun gear 111 rotates in the opposite direction to the arrow d of FIG. 3, the rotation amount of the planetary gears 120 is decreased and the rotation amount of the ring gear 130 is also decreased.

By executing the driving control of the driving motor 114 as described above, the rotation amount of the sun gear 111 is controlled, whereby the rotation transmission ratio for transmission of rotation of the input shaft 10 to the output shaft 20 can be changed.

An electronic control unit (ECU) 200 receives detection results from an absolute position sensor 41 for detecting an absolute position as a rotational position of the input shaft 10, from a vehicle speed sensor 42 for detecting a running speed of the vehicle, and from an ignition switch 43, and carries out various controls, based thereon.

First, with detection of the on operation of the ignition switch 43, the ECU 200 executes a return process for returning the positional relation between the input shaft 10 and the output shaft 20 to the normal positional relation. This is a process for returning the shafts to their normal positions, because the positional relation between the input shaft 10 and the output shaft 20 becomes out of order when the steering wheel is manipulated during the period between the off operation and the on operation of the ignition switch 43 (i.e., during the stop of the transmission ratio control), as described previously. After this return process, the ECU immediately starts the transmission ratio control for changing the transmission ratio of the transmission ratio changing mechanism 100 in accordance with the vehicle speed V, so that the transmission ratio control is carried out so as to achieve the transmission ratio according to the vehicle speed V as shown in aforementioned FIG. 6. The ECU 200 also executes an operation control of shift lock unit 44 for locking the shift lever of automatic transmission (AT), and with actuation of the shift lock, the shift lever comes to be prevented from being shifted from the P range to another range.

Each control process executed in the ECU 200 as described will be described below according to the flowchart of FIG. 4.

Figure 4:
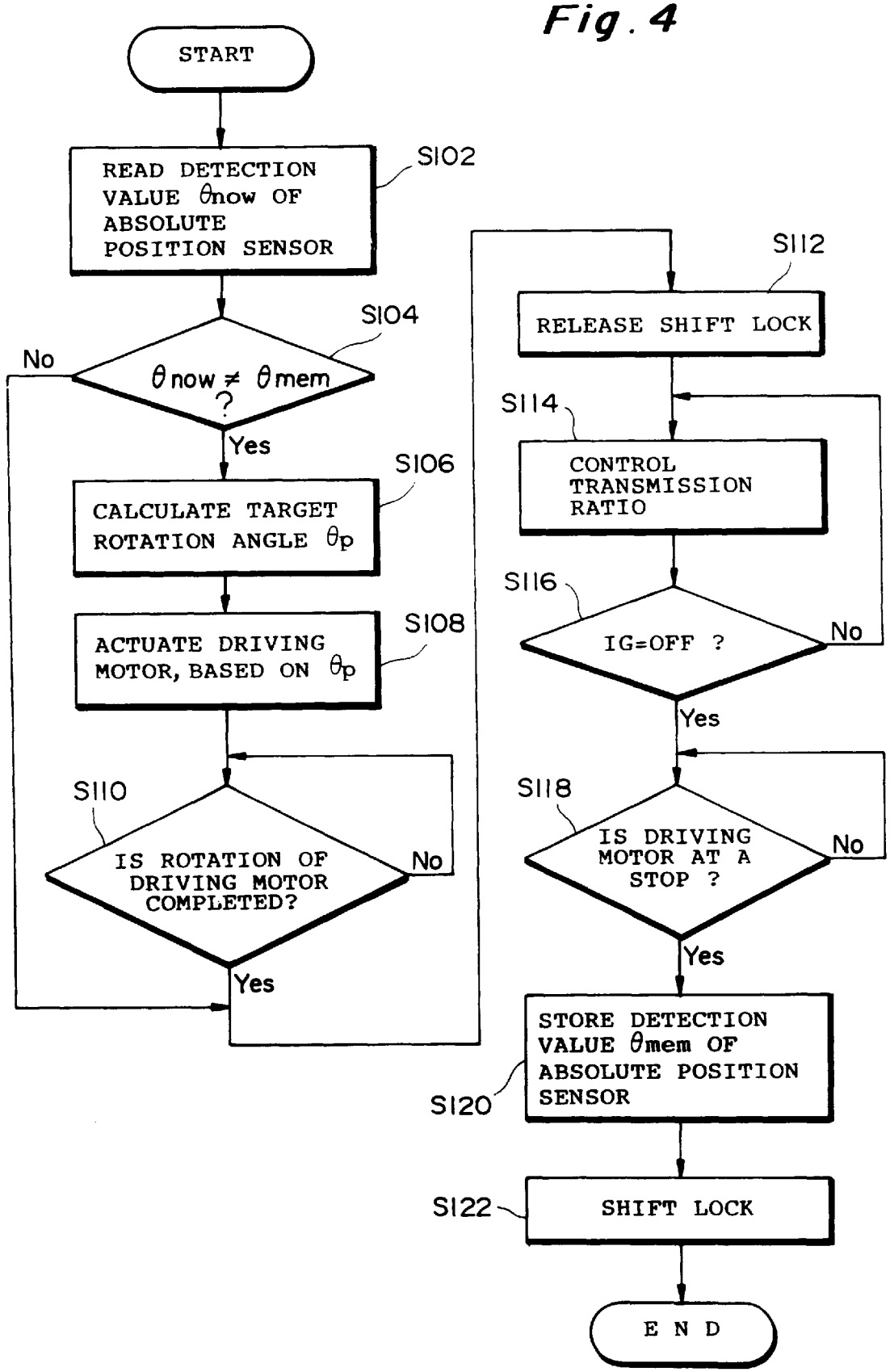
FIG. 4 is a flowchart to sequentially show the processes according to the first embodiment.

The flowchart shown in FIG. 4 is started by the on operation of the ignition switch 43. First, the ECU proceeds to step (as will be referred hereinafter to as "S") 102 to read a detection value θ now of the absolute position sensor 41, which is an absolute position of the input shaft 10.

In subsequent S104 the ECU reads a detection value θ mem of the absolute position sensor 41 stored at the end of the transmission ratio control in the preceding routine and determines whether θ now≠θ mem. The step of storing this detection value θ mem corresponds to S120 described hereinafter.

When θ now≠θ mem, that is, when the absolute position of the input shaft 10 is different from that at the end of control, the determination in S104 is Yes (True) and the ECU goes to S106.

In S106 the ECU calculates a target rotation angle θp to which the output shaft 20 should be rotated. Specifically, the target rotation angle is calculated according to θp=(Gb−Go)(θ now−θ mem), using the base transmission ratio Gb of the transmission ratio changing mechanism and the transmission ratio Go at the vehicle speed V=0.

In subsequent S108 the ECU outputs a driving signal based on θp calculated in S106 to the driving motor 114, thereby actuating the driving motor 114. The actuation of the driving motor 114 causes the worm gear 113 to be rotated as described above, and this rotation is transmitted through the worm wheel 112 and sun gear 111 to the planetary gears 120, whereby the ring gear 130 in mesh with the planetary gears 120 comes to rotate in unison with the output shaft 20. The output shaft 20 can be rotated by the target rotation amount θp by this mechanism.

In subsequent S110 the ECU repetitively carries out a process for determining completion of rotation of the driving motor 114 for the return process, and the ECU proceeds to S112 at the time of the determination that the rotation of driving motor 114 is completed.

When the determination is No in previous S104, θ now=θ mem. In this case, the steering wheel was not manipulated during the period between the off operation and the on operation of the ignition switch 43, so that no change appears in the positional relation between the input shaft 10 and the output shaft 20. In this case, the return process of S106 to S110 described above is not carried out and then the ECU goes directly to S112.

In S112 the ECU carries out a control of operation of the shift lock unit 44 to release the shift lock. With execution of this operation control, it becomes possible to shift the shift lever from the P range to another range. In other words, while the return process of S106 to S110 is carried out, the shift lever is kept in the locked state to restrict running of the vehicle before completion of rotation of the driving motor 114 in S110. This permits the apparatus to avoid the situation where the vehicle starts running during the execution of the return process.

Figure 6:
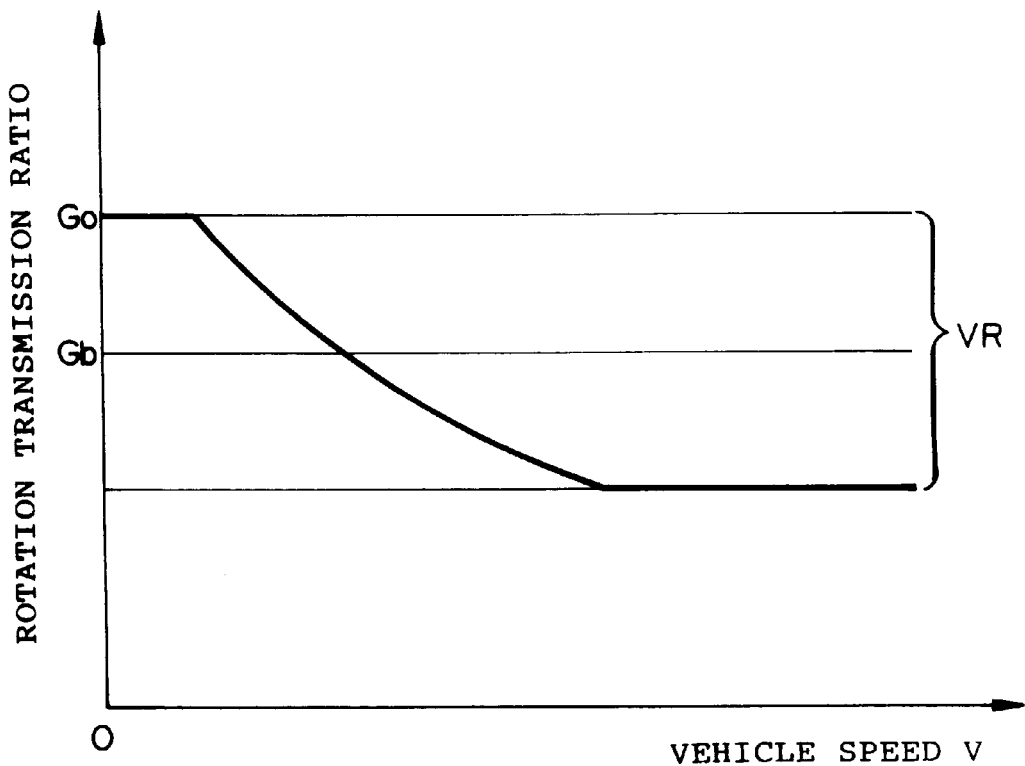
FIG. 6 is a graph to show set values of transmission ratios according to vehicle speeds.

After the shift lock is released in S112, the ECU goes to S114 to start the normal transmission ratio control for controlling the transmission ratio of the transmission ratio changing mechanism 100 in accordance with the vehicle speed V as shown in aforementioned FIG. 6. This transmission ratio control is kept on until the off operation of the ignition switch 43 is detected in S116.

When the off operation of the ignition switch 43 is detected in S116 ("Yes" in S116), the ECU goes to S118 to determine whether the driving motor 114 is at a standstill. This determination process is carried out, for example, based on whether the driving signal is outputted to the driving motor 114.

When S118 results in determining that the driving motor 114 is at a standstill ("Yes" in S118), the ECU moves to S120 to store the detection value θ mem of the absolute position sensor 41 at this time.

This process stores the absolute position of the input shaft 10 at the stop of control.

After this, the ECU proceeds to S122 to carry out the operation control of the shift lock unit 44 to execute the shift lock for locking the shift lever in the P range, and then terminates this routine.

As described above, the absolute position of the input shaft 10 at the end of control is stored in S120, and it is then compared with the absolute position of the input shaft 10 at the time of the next start of this routine, whereby it can be determined whether agreement is achieved in the positional relation between the input shaft 10 and the output shaft 20 and whereby the ECU can move to the return process for returning the positional relation between the input shaft 10 and the output shaft 20 to the normal positional relation.

The second embodiment will be described below.

The first embodiment described above was based on the assumption that the steering operation was not carried out during the return process, whereas the second embodiment described below is arranged to return the input shaft 10 and the output shaft 20 to the normal positional relation, taking account of the case where the steering operation is carried out during the return process. The operation will be described below according to the flowchart of FIG. 5.

Figure 5:
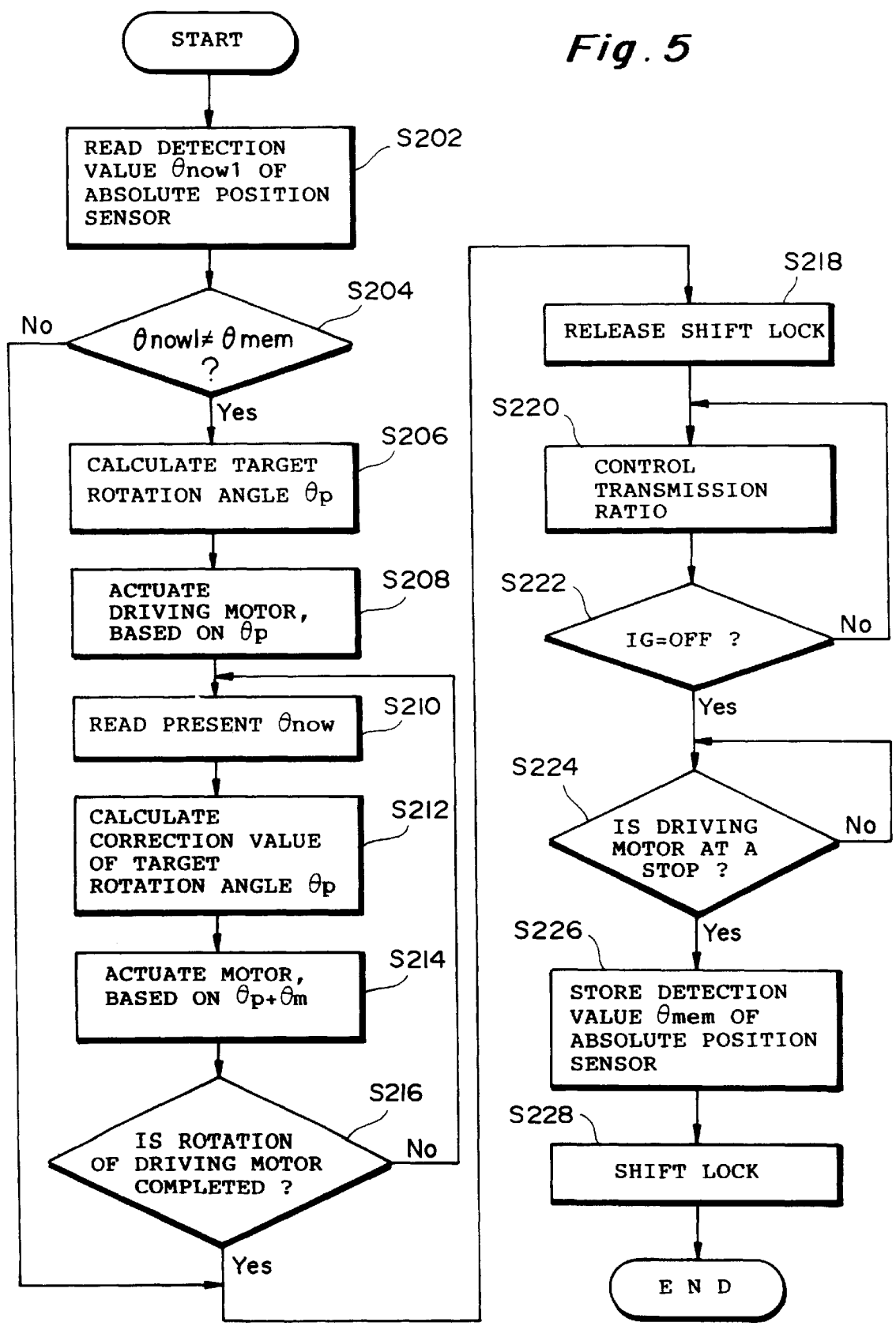
FIG. 5 is a flowchart to sequentially show the processes according to the second embodiment.

The flowchart shown in FIG. 5 is started by the on operation of the ignition switch 43 and in S202 the ECU reads a detection value θ now1 of the absolute position sensor 41, which is the absolute position of the input shaft 10.

In subsequent S204 the ECU reads the detection value θ mem of the absolute position sensor 41 stored at the end of the transmission ratio control in the preceding routine and determines whether θ now1≠θ mem. The step of storing this detection value θ mem corresponds to S226 described hereinafter.

When θ now1≠θ mem, that is, when the absolute position of the input shaft 10 is different from that at the end of control, the determination in S204 is Yes (True) and the ECU goes to S206.

In S206 the target rotation angle θp to which the output shaft 20 should be rotated is calculated in the same manner using the same calculation equation as in S106 of the first embodiment; in subsequent S208 the ECU outputs the driving signal based on the target rotation angle θp calculated in S206 to the driving motor 114, thereby actuating the driving motor 114. This carries out the return process.

In subsequent S210 the ECU reads a present detection value θ now of the absolute position sensor 41 to detect the absolute position of the input shaft 10 during execution of the return process.

In subsequent S212 the ECU calculates a correction value θm of the target rotation angle θp obtained in S206, based on the detection value θ now1 read in S202 and the detection value θ now read in S210. Specifically, the correction value is calculated according to θm=Gm· Go·(θ now−θ now1), using the transmission ratio Gm according to the steering angle and the transmission ratio Go at the vehicle speed V=0. The transmission ratio Gm in this equation is set, for example, by map search from a map in which transmission ratios are set according to detection values θ now. Therefore, with no steering operation during the return process, θ now=θ now1, and thus θm=0 from the above equation.

In subsequent S214 the ECU outputs a driving signal based on θp+θm, obtained based on the target rotation angle θp calculated in S206 and the correction value θm calculated in S212, to the driving motor 114, thereby actuating the driving motor 114.

In subsequent S216 the ECU repetitively executes the process for determining completion of rotation of the driving motor 114 for this return process. When the rotation is not completed (or if "No" in S216), the process of S210 and after is carried out again. Then the ECU proceeds to S218 at the time of the determination that the rotation is completed.

By carrying out the process of S210 to S216 during the return process as described above, the positional relation between the input shaft 10 and the output shaft 20 can also be returned to the normal positional relation even if the steering operation is carried out during the return process.

When the determination is No in previous S204, θ now1=θ mem. In this case, the ECU moves directly to S218 without executing the return process of S206 to S216.

The process of S218 to S228 executed thereafter is the same as the process of S112 to S122 in the first embodiment, and thus the description thereof is omitted herein.

Each of the embodiments described above was the example wherein the absolute position sensor 41 was mounted on the input shaft 10, but the absolute position sensor 41 can also be mounted on the output shaft 20. In this case the same return process as in each embodiment can also be carried out. It can also be contemplated that the input shaft 10 and the output shaft 20 are both provided with the absolute position sensor 41. In this case, the detection value of the absolute position sensor 41 does not have to be stored at the off operation of the ignition switch 43, but detection values from the two absolute position sensors are read immediately after the on operation of the ignition switch 43 to carry out the return process based on the two detection values.

As stated above, the above steering apparatus for vehicle comprises: input shaft 10 coupled to a steering shaft 1; output shaft 20 coupled to input shaft 10; sensor 41 disposed to detect a rotation amount of at least one of said input and output shafts 10, 20; and mechanism 100 disposed to transmit rotation of input shaft 10 to output shaft 20 at a changeable ratio, wherein the rotation amount of output shaft 20 relative to input shaft 10 is adjusted by action of mechanism 100 based on a value obtained by sensor 41.

In other words, the steering apparatus for vehicle is provided with the return control means for actuating the driving means, based on the detection result of the position detecting means, to achieve agreement of the positional relation between the input shaft and the output shaft, so that the positional relation between the steering wheel and the turned wheels can be returned to the normal positional relation even if the steering wheel was manipulated during the stop of the transmission ratio control.

Further, the positional relationship between input and output shafts 10, 20 is adjusted to be in agreement.

Further, the rotational amount adjustment begins with ON operation of an ignition switch IG of the vehicle.

Further, the driving of the vehicle during said adjustment is prevented.

In other words, the steering apparatus for vehicle is further provided with the driving restricting means for restricting driving of the vehicle during the return process carried out by the return control means, so that the apparatus can avoid the situation where the vehicle starts running in the state of disagreement of the positional relation between the input shaft and the output shaft.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A steering apparatus for a vehicle comprising:
   (A) an input shaft coupled to a steering shaft;
   (B) an output shaft coupled to said input shaft;
   (C) a sensor disposed to detect a rotation amount of at least one of said input and output shafts; and
   (D) a mechanism disposed to transmit rotation of said input shaft to said output shaft at a changeable ratio, wherein the rotation amount of said output shaft relative to said input shaft is adjusted by action of said mechanism based on a value obtained by said sensor before turning off an ignition switch and a detected input shaft steering value at the turning on of the ignition switch.

2. A steering apparatus for a vehicle according to claim 1, wherein positional relationship between said input and output shafts is adjusted to be in agreement.

3. A steering apparatus according to claim 1, wherein said output shaft is coupled to said input shaft through said mechanism.

4. A steering apparatus for a vehicle according to claim 1, wherein rotation amount adjustment begins with an ON operation of an ignition switch of the vehicle.

5. A steering apparatus for a vehicle according to claim 4, further comprising an ECU that stores a rotation amount of the at least one of said input and output shafts when the ignition switch of the vehicle is switched OFF.

6. A steering apparatus for a vehicle according to claim 5, wherein rotation amount adjustment is provided when a rotation amount determined at the beginning of the ON operation of the ignition switch differs from the rotation amount stored in the ECU.

7. A steering apparatus according to claim 1, wherein the sensor is located to detect rotation of the input shaft.

8. A steering apparatus according to claim 1, wherein the sensor is an absolute position sensor.

9. A steering apparatus for a vehicle comprising:
   (A) an input shaft coupled to a steering shaft;
   (B) an output shaft coupled to said input shaft;
   (C) a sensor disposed to detect a rotation amount of at least one of said input and output shafts; and
   (D) a mechanism disposed to transmit rotation of said input shaft to said output shaft at a changeable ratio, wherein the rotation amount of said output shaft relative to said input shaft is adjusted by action of said mechanism based on a value obtained by said sensor before turning off an ignition switch and a detected input shaft steering value at the turning on of the ignition switch,
   wherein driving of the vehicle during said adjustment is prevented.

10. A steering apparatus for a vehicle according to claim 9, wherein driving is prevented by a shift lock.

* * * * *